United States Patent [19]
Barron et al.

[11] Patent Number: 4,916,183
[45] Date of Patent: Apr. 10, 1990

[54] COPOLYMERS AS THICKENERS AND MODIFIERS FOR LATEX SYSTEMS

[75] Inventors: Milagros C. Barron, Red Bank, Tenn.; Ronald L. Swope, Fort Oglethorpe, Ga.; John M. Wilkerson, III, Hixson; Charles G. Ruffner, Chattanooga, both of Tenn.

[73] Assignee: National Starch and Chemical Corporation, Bridgewater, N.J.

[21] Appl. No.: 318,140

[22] Filed: Mar. 2, 1989

Related U.S. Application Data

[63] Continuation-in-part of Ser. No. 46,458, May 6, 1987.

[51] Int. Cl.$^4$ ............................................ C08F 220/34
[52] U.S. Cl. ...................................... 524/555; 524/813; 526/932
[58] Field of Search ................. 526/932; 524/813, 555

[56] References Cited

U.S. PATENT DOCUMENTS 4,514,552  4/1985  Shay et al. ........................... 524/813

Primary Examiner—Joseph L. Schofer
Assistant Examiner—Peter D. Mulcahy

[57] ABSTRACT

A thickened aqueous copolymer solution useful for thickening and improving the properties of latex systems comprising a copolymer having as monomeric units: about 79–99 percent of a (meth)acrylic acid salt of sodium, potassium, or ammonium; about 0–20 percent of (meth)acrylic acid; about 0—20 percent of a lower alkyl ester of (meth)acrylic acid; about 1–21 percent of surfactant units selected from the urea reaction product of a monoethylenically unsaturated monoisocyanate with a nonionic surfactant having amine functionality; and about 0–1 percent of a copolymerizable polyethylenically unsaturated monomer, said percentages being by weight based on the total weight of monomeric units in said copolymer.

16 Claims, No Drawings

COPOLYMERS AS THICKENERS AND MODIFIERS FOR LATEX SYSTEMS

This is a continuation-in-part application of copending U.S. patent application Ser. No. 07/046,458, filed May 6, 1987.

BACKGROUND OF THE INVENTION

This invention relates to aqueous copolymer solutions which thicken, modify rheology, stabilize, and otherwise improve the physical properties of latex systems and dried film resulting from application of latex systems to substrates. Of particular importance is the increase in tensile strength of dry latex films provided by the addition of the novel copolymer solutions to latex coating compositions.

Various polymeric materials have been used to thicken latex formulations, improve their mechanical stability, suspend added fillers, and to impart to the formulations the required flow properties and viscosity for application, as well as impart desirable properties to dried films and coatings after application. Sodium polyacrylate solutions resulting from hydrolysis of polymethyl acrylate are used as thickeners, especially in styrene-butadiene latex compositions containing calcium carbonate and/or kaolin fillers. Such polyacrylate solutions are generally supplied at a viscosity low enough for pumping from tank trucks and for rapid mixing into the latex compositions, yet they are cost effective in thickening latex compositions. They fill a need in highly-automated upholstery fabric backing and carpet backing latex adhesive applications.

The alkali reactive type of thickeners, a typical example of which is disclosed in U.S. Pat. No. 3,070,561, are copolymer emulsions in which the copolymer chain contains both ester and carboxyl groups. Neutralization of the carboxyl groups by addition of alkali at ambient temperature leaves the ester group unaffected, but converts the emulsion to a relatively clear alkali metal or ammonium salt solution of greatly increased viscosity.

Recent improvements of alkali reactive thickeners are disclosed in U.S. Pat. Nos. 4,351,754, 4,384,096, 4,514,552, 4,600,761 and 4,616,074. Such improvements result from inclusion of certain surfactant monomers in these associative copolymer thickeners. Such thickeners and their thickening mechanism are discussed in "Water-Soluble Polymers" by J. E. Glass, Editor, American Chemical Society, Washington, D.C. (1986). These products have been found to be useful in only a limited number of applications, and have been found to be unsatisfactory in the thickening of highly-loaded styrene-butadiene latex compositions used as carpet and fabric backing adhesives which generally are applied by automated methods in carpet and upholstery mills.

Other types of associative thickeners are described in the patent literature. Thus, U.S. Pat. No. 3,708,445 discloses aqueous solution copolymers of certain surfactant monomers with carboxylic acid monomers, to be useful in thickening latex compositions. U.S. Pat. No. 4,138,381 discloses glycol solution terpolymers of certain surfactant monomers with alkyl (meth)acrylate and carboxylic acid monomers to be useful for thickening aqueous polymeric lattices. U.S. Pat. No. 4,268,641 describes copolymers of certain types of surfactant acrylates with carboxyl-containing, ethylenically unsaturated hydrocarbons. Such copolymers generally are polymerized in an organic liquid from which the copolymer precipitates. When base-neutralized the copolymers are useful as thickeners.

In spite of the considerable research activity in this field, the sodium polyacrylate solution thickeners resulting from hydrolysis of polyacrylic acid esters remain the thickeners of first choice for many textile back coating and adhesive applications. These polymers, sometimes crosslinked, have continued in use for almost thirty years without substantial change. However, changes in equipment, compound formulations, and other conditions of use dictate a constant demand for changes and improvements in these polymer thickeners.

SUMMARY OF THE INVENTION

According to one aspect of this invention new aqueous solutions of anionic copolymers are provided which are useful for thickening and improving the characteristics of latex systems.

As another aspect of this invention are provided new dry copolymer products useful in the aqueous solutions.

Still a further aspect of this invention provides copolymerizable monomers and surfactants for use in the copolymer products and aqueous solutions of the invention.

The invention also provides methods for improving the rheological properties of a latex composition which includes addition to such compositions the copolymers or aqueous solutions disclosed by the invention.

The copolymers of the invention are prepared either by emulsion polymerization or solvent polymerization. The former procedure preferably is employed where the copolymers are obtained by copolymerization of an alkyl ester (meth)acrylate, surfactant monomers having amine functionality and optionally a small amount of a copolymerizable polyethylenically unsaturated crosslinking monomer. Following polymerization the major portion of the ester groups are hydrolyzed by addition of base to provide acrylate salt groups, whereby the copolymer goes into solution with resultant thickening of the aqueous system in which the copolymer is present.

However, because of the greater solubility of (meth)acrylic acid, as compared to the lower alkyl esters thereof, the copolymerization can be carried out in a solvent for the monomers, such as water, where (meth)acrylic acid per se is used as a monomer rather than a lower alkyl ester thereof. The major portion of the carboxyl groups are neutralized before, during or after polymerization with resulting thickening of the aqueous system.

The copolymers of this invention provide thickeners for latex and latex-based formulations which significantly improve the overall rheological properties thereof while retaining the proven benefits of the hydrolyzed polyacrylate products. An unexpected additional benefit of the present invention is an increase in tensile strength of dried latex coatings by the inclusion in the lattices of the copolymer solutions of this invention.

Other aspects and advantages of the products and methods of the present invention are further discussed in the following detailed description, including preferred embodiments of this invention.

DETAILED DESCRIPTION OF THE INVENTION

The present invention thus provides thickened aqueous copolymer solutions useful for thickening and improving the rheology and dry tensile strength of latex systems, and the corresponding copolymer monomers. The copolymer solutions contain a copolymer having as monomeric units:

(A) about 79-99 percent of a (meth)acrylic acid salt of sodium, potassium or ammonium;

(B) about 0-20 percent of (meth)acrylic acid;

(C) about 0-20 percent of a lower alkyl ester of (meth)acrylic acid;

(D) about 1-21 percent of surfactant monomer units selected from the urea reaction product of a monoethylenically unsaturated monoisocyanate with a nonionic surfactant of the formula $$R_1[(OC_nH_{2n})_a(OCH_2CH)_b(OC_mH_{2m})_c(OCH_2CH)_d]_e-NH_2$$
$$\qquad\qquad\qquad |\qquad\qquad\qquad\qquad |$$
$$\qquad\qquad\qquad R_2\qquad\qquad\qquad\qquad R_3$$

where $R_1$ is a $C_8$ to $C_{20}$ alkyl or $C_8$ to $C_{20}$ alkylphenyl or a di($C_8$ to $C_{20}$ alkyl)phenyl, n and m are independently selected from 2 to 4, a and c are independently selected from the range of 0 to 100, provided that a+c is within the range of 2 to 100; $R_2$ and $R_3$ are independently selected from $CH_3$ or $CH_2CH_3$, b and d are independently selected from the range of 0 to 50, provided that b+d is within the range of 0 to 50; and e is from 1 to 50; wherein the sum of a+c is always greater than the sum of b+d;

(E) about 0-1 percent of a copolymerizable polyethylenically unsaturated monomer, said percentages being by weight based on the total weight of monomer units.

The copolymers employed in the copolymer solution of this invention are prepared either by emulsion polymerization or by polymerization in a solvent for the monomers. The route selected will depend on the solubility of the monomers in the reaction medium which preferably is water. In either instance there results an aqueous copolymer solution.

In a preferred embodiment of the copolymer solution, the copolymer is composed of (A) about 92-99 percent (meth)acrylate salt, (B) about 0-8 percent (meth)acrylic acid, (C) about 0-8 percent (meth)acrylic lower alkyl ester, (D) about 1-8 percent surfactant monomer units, and (E) about 0.1-0.5 percent crosslinking monomer units.

With regard to component (A) in the above-recited formula for copolymer solutions, the terms "(meth)acrylic acid" and "(meth)acrylate" as used in this specification and appended claims refer to acrylic and methacrylic acid and acrylates and methacrylates, i.e. lower alkyl esters of the acids, respectively. In the polymerization reaction by which the copolymers are synthesized, either the acids per se and/or the lower alkyl esters may be used as monomers. In either instance, however, the resulting copolymers are treated with base. Where acid monomer units per se are present, the major portion of the free carboxyl groups are neutralized to form salts. Preferred neutralizing alkaline reactants are sodium, potassium and ammonium hydroxide.

The conversion of the carboxyl groups into salt groups renders the copolymers water soluble so that there is formed a substantially clear aqueous solution of substantially increased viscosity.

(Meth)acrylic acid per se may be used as one of the monomers in the polymerization reaction, and in the copolymer (meth)acrylic acid units may be present up to about 20 percent by failure to neutralize (meth)acrylic acid monomer or hydrolyze lower alkyl (meth)acrylate ester monomer. Preferably, the copolymer does not contain more than about 8 percent of (meth)acrylic acid units.

The lower alkyl (meth)acrylates which may be used in the copolymerization reaction have the general formula $$CH_2=CYZ$$

where Y is hydrogen or $CH_3$ and Z is $$\begin{matrix} O \\ \| \\ COR, \end{matrix}$$

where R is alkyl containing from 1 to 4 carbon atoms. Examples of such nonionic acrylates are methyl acrylate, ethyl acrylate, butyl acrylate, methyl methacrylate, ethyl methacrylate and butyl methacrylate. Preferred monomers are methyl and ethyl (meth)acrylate and mixtures thereof.

The nonionic acrylate units in the copolymer generally comprise up to about 20 percent of the total monomer units, and preferably about 0-8 percent. It can be seen, however, that where a (meth)acrylate is employed as a monomer in the polymerization reaction a considerably larger proportion thereof may be present. The percentages given for the nonionic units are those remaining subsequent to alkaline hydrolysis.

Where nonionic (meth)acrylate units are present, the major portion thereof are hydrolyzed by alkali, particularly sodium and potassium hydroxide whereby the ester groups are converted to alkali metal salt groups.

The surfactant monomers used in preparing the copolymers according to this invention are urea reaction products of a monoethylenically unsaturated monoisocyanate with certain nonionic surfactants having amine functionality. A preferred isocyanate for use in forming the compositions of this invention is alpha, alpha-dimethyl-m-isopropenyl benzyl isocyanate [m-TMI from American Cyanamid Corp.]. Other monoisocyanates useful in preparing the urea monomers have the formula $$\begin{matrix} O \\ \| \\ Z-C-O-A-N=C=O \end{matrix}$$

where A is an alkylene group of the formula $(CH_2)_n$, where n is from 1 to 20, and Z is $CH_2=CH-$, $CH_2=C(CH_3)-$, or $CH_2=CH-CH_2-$. A monoisocyanate of the above formula is isocyanatoethyl methacrylate [Dow Chemical Corp.]. Nonionic surfactants for reaction with the monoisocyanates to provide urea monomers of the present invention are characterized by the presence of a primary amine. Preferred nonionic surfactants of the formula in (D) above include those in which $R_1$ is nonylphenyl or octylphenyl or dinonylphenyl or dioctylphenyl. Such preferred surfactants are characterized by the above formula where n and m are each 2 and $R_2$ and $R_3$ are each $CH_3$, so that the polymer strand is formed of a series of oxyethylene (EO) and oxypropylene (PO) moieties. Although the EO moieties must always exceed the number of PO moieties, the formula allows for the EO and PO components to be arranged in a random mixture in the surfactant used in the compositions of the present invention. Preferred surfactants of this formula contain a minimum of two moles of EO. Practical limitations on the amount of EO and PO in the formula include a maximum of about 100 moles of EO in a surfactant of the above formula. Similarly a practical maximum of about 50 moles of PO for surfactants of the above formula is appropriate. In the selection of a nonionic surfactant according to this invention, the smaller the $R_1$ component, the smaller is the number of EO components in the surfactant, and vice versa.

Such presently preferred embodiments of the present invention employ a class of surfactants for use in the present invention which have the formula above where R1 is octylphenyl or nonylphenyl, n is from 2 to 4, a is from 3 to 30, $R_2$ is $CH_3$ or $CH_2CH_3$, b is from 0 to 10, c, d and m are 0, and e is 1. An example of a suitable nonionic surfactant which falls within this formula and can be reacted with the monoisocyanates according to this invention is nonylphenoxy poly[(oxyethylene)$_{9.5}$(oxypropylene)$_2$] amine [Texaco, Inc.].

Other preferred embodiments of the present invention employ a class of surfactants for use in the present invention which have the formula of (D) above where R1 is octylphenyl or nonylphenyl, a and d are 0, b is from 1 to 10, m is from 2 to 4, c is from 3 to 30, $R_3$ is $CH_3$ or $CH_2CH_3$, and e is 1. An example of a suitable nonionic surfactant which falls within this formula and can be reacted with the monoisocyanates according to this invention is nonylphenoxy poly[(oxypropylene)$_2$(oxyethylene)$_{9.5}$] amine.

Other surfactants falling with the formula of (D) above may also be employed in the compositions of the present invention.

These surfactant reactants for the most part are commercially available. By employing a suitable stannous catalyst, the condensation may be carried out at a relatively low temperature, e.g 40° C. to 60° C. and essentially quantitative yields obtained. No by-products are formed, and thus purification of the product is unnecessary. This feature of the reaction is important in determining and controlling the amount of bound surfactant monomer present in the copolymer, whereby copolymer reproducibility is readily accomplished.

Preferably the nonionic surfactant monomer comprises about 1 to about 21 percent of the copolymer, the percentage being by weight based on total weight of monomer units. The particularly preferred amount of such nonionic surfactant monomer is from about 1 to about 8 percent.

Preparation of the urea surfactant monomers is described in detail in Example I. General conditions for the reaction are also described in the references cited above in the prior art discussion. Such procedures are well known, and the details thereof are not to be construed as limiting this invention.

Also employed as an optional component in the copolymer solutions of the present invention is a small amount, such as 0 to 1 percent, preferably 0.1 to 0.5 percent, of a polyethylenically unsaturated crosslinking monomer. This monomer may be added as a crosslinking agent for the copolymers. Suitable monomers for this use include diallyl phthalate, vinyl crotonate, allyl methacrylate, divinyl benzene, and the like.

The above-described components of the copolymer solutions of this invention are copolymerized as follows. When (meth)acrylic acid ester monomers are used as the major source of carboxylic monomer units in the copolymers, the copolymerization preferably is carried out by ordinary emulsion polymerization techniques, at a concentration of monomer in water of about 16%. Typical performance of this reaction is described in Example II. Conventionally, there is considerable latitude in choice of reaction temperature, initiator system, and emulsifier(s) for this reaction. Choice of emulsifier, in particular, can be used to vary product properties and may be selected by one of skill in the art. Pre-emulsion of monomers is useful in minimizing coagulum formation. Conditions for basic hydrolysis of the copolymer emulsion are not critical, provided that the hydrolysis is continued until the base is consumed and a solution is formed. The amount of base should be sufficient so that in the copolymer there are at least 79% by weight of (meth)acrylic acid salt units. It is good practice to add the base slowly to the copolymer emulsion which preferably has been cooled to ambient temperature with good stirring. Preferred conditions for carrying out the hydrolysis are a reaction temperature of 90° to 95° C., with a 4 to 16 hour cook time. If a volatile base is chosen, the hydrolysis may be conducted under pressure. It is convenient to keep the alcohol liberated on hydrolysis in the resulting thickened aqueous solution of copolymer product, for the alcohol has little effect on product properties. However, the alcohol can optionally be removed by distillation if the end use application of the composition requires absence of alcohol.

Solution polymerization is preferred when monomer salt units (A) of the copolymer solution result from neutralization of the acid per se. A convenient technique is the concurrent feeding of initiator solution and of a mixture of the monomers to a reactor containing water held at 40° to 100° C. Such common expedients as nitrogen sparging, and the use of redox initiating systems, metal activators, and chain length regulators may be employed.

The degree of hydrolysis or neutralization in preparation of the copolymers may be chosen within wide limits, subject to end use requirements of compatibility and effectiveness in the formulation to be thickened and provided that the copolymers contain at least 79%, by weight, of carboxylic acid salt units. Neutralized copolymer solutions may have a pH as low as 6. Generally, optimum thickening performance is achieved when the copolymer solution has a pH range of 8 to 12.

The average molecular weights of copolymers are estimated to be between about 100,000 and 5,000,000. Preferred copolymers have an average molecular weight of from about 200,000 to 1,000,000.

Generally the copolymer solutions of this invention will have a solids content of from about 8% to about 20%. The amount of copolymer solution added to a latex to thicken it and improve its rheological properties preferably provides from about 0.2 to about 3 parts by weight of copolymer, dry basis, based on 100 dry parts of latex. The copolymer products may be dried, to reduce shipping costs, or to remove solvent, aqueous or organic.

The following examples are provided for illustration only, and are not intended to limit the scope of this invention in any way.

EXAMPLE I:

Preparation of a surfactant urea monomer.

264 grams (0.352 mole) of nonyl phenoxy poly[(oxyethylene)$_{9.5}$(oxypropylene)$_2$] amine [Texaco, Inc.] were slowly heated in a 1-liter reactor fitted with a thermometer, stirrer, reflux condenser, and heating mantle.

When the temperature of the amine reached 40° C., 0.69 g of the monomethyl ether of hydroquinone and 0.67 g of stannous octoate were added. The solution was then heated to 50° C. and 69.8 g (0.347 mole) of alpha, alpha-dimethyl-m-isopropenyl benzyl isocyanate [American Cyanamid Corp] were added dropwise from an addition funnel over a two-hour period while the reaction mixture was maintained at 55° to 60° C. The reaction mixture was then cooked 1 hour at 60° C. The final product after cooling was a viscous solution.

Additional surfactant urea monomers of the present invention used in the following examples and tables were made by substantially the same method describe above in Example I.

EXAMPLE II:

Preparation of a copolymer of the invention by emulsion polymerization and hydrolysis.

A mixture of 345 g water, 2.8 g of ethoxylated nonyl phenol (Igepal CO-990, GAF Corporation), and 0.37 g soda ash were charged to a 1-liter reactor fitted with a thermometer, stirrer, condenser, and heating mantle.

A pre-emulsion of monomers was prepared in a beaker by mixing 182 g water, 2.8 g of urea monomer prepared according to Example I, 8.0 g ethoxylated nonyl phenol, 46.4 g (0.539 eq.) methyl acrylate, 46.4 g (0.463 eq.) ethyl acrylate, and 0.20 g divinyl benzene.

The reactor charge was heated to 80° C. and 0.57 g potassium persulfate was added. The monomer pre-emulsion and 12 g of a 5 percent solution of potassium persulfate were added from addition funnels at constant rates over 90 minutes while maintaining the reaction mixture at 80° C. The latex formed was cooked at 88° C. for 1 hour, 100 g water were added, and the mixture was cooled to 30° C.

145 g of a 25 percent solution of sodium hydroxide (0.906 eq.) were added to the latex with mixing over 10 minutes. The mixture was heated to 90° to 95° C. and cooked at that temperature for 16 hours.

The product was a clear solution having a solids content of 13.0 percent, a viscosity of 12,000 cps, and a pH of 8.9.

EXAMPLE III:

Preparation of a copolymer solution by aqueous solution polymerization and neutralization.

To a 1.5 liter reaction flask equipped with a thermometer, mechanical stirrer, heating mantle, nitrogen inlet and condenser, were charged 920 g of city water, 178.2 g of acrylic acid and 2.7 g of the urea monomer of Example I.

The reactor charge was heated to 40° C. and purged with nitrogen. At 40° C., 1.08 g of an 8.26 percent aqueous solution of ammonium persulfate were added followed after 1 minute by addition of 0.54 g of a 4.3% solution of sodium metabisulfite. An exotherm was noted after a few minutes. The temperature then rose to 70° C. to 80° C. within 10 minutes. The resulting polymer was then held at 70° C. to 80° C. for 1 hour. The product was cooled and a 50 percent sodium hydroxide solution was added to increase the pH to 8 to 9.

The procedures of Examples II and III were used to prepare the copolymer solutions (CS) in Table A. The CS numbers are arbitrary designations. For all examples the copolymerizable surfactant monomer (CPS) was the product described in Example I above.

TABLE A

| CS* No. | CPS No. | Weight % Monomer as Charged | | | | | | Weight % Monomer Units in Copolymer After Hydrolysis of Neutralization | | | % Hydrolysis as mole % NaOH on Lower Acrylic Esters |
|---|---|---|---|---|---|---|---|---|---|---|---|
| | | CPS | Acrylic Acid | Methyl Acrylate | Ethyl Acrylate | Divinyl Benzene | CPS | Residual MA/EA** Total | Sodium Acrylate | Divinyl Benzene | |
| 8 | 3 | 2.9 | 0 | 97 | 0 | 0.20 | 2.7 | 12.3 | 85 | 0.18 | 86 |
| 10 | 3 | 1.5 | 99 | 0 | 0 | 0.0 | 1.5 | 0.0 | 99 | 0.00 | 98% (neutralization) |
| 248 | 3 | 10 | 0 | 45 | 45 | 0.19 | 10 | 11 | 79 | .19 | 80 |
| 249 | 3 | 15 | 0 | 42.5 | 42.5 | 0.19 | 15 | 6 | 79 | .19 | 80 |
| 250 | 3 | 20 | 0 | 40 | 40 | 0.19 | 20 | 1 | 79 | .19 | 80 |
| 117 | 3 | 2.9 | 0 | 48 | 48 | 0.20 | 3.0 | 4.7 | 92 | .21 | 91 |

*Copolymer Solution
**MA refers to methyl acrylate, and EA refers to ethyl acrylate.

EXAMPLE IV:

The Properties of the Above-Described Copolymers and Solutions.

The rheological properties that the copolymer solutions of this invention contribute to a latex coating system were evaluated using a typical carpet coating formulation. Such carpet coatings consist of a latex binder with 100 to 800 parts by weight of filler, usually calcium carbonate. Also, such type coatings usually contain a frothing aid to facilitate the aeration of the coatings. The viscosities of the coatings are modified with a thickener, such as a copolymer solution of this invention, to achieve the desired rheological properties.

The properties which exemplary copolymer solutions of this invention (CS #8 and 10 from Table A) contribute to a carpet coating system are provided in Table B. The coating system used in this evaluation consisted of 100 dry parts of styrene butadiene latex (Reichold Chemical, Inc. Latex 69700), 600 dry parts of calcium carbonate filler, and 1.2 parts of foaming agent (Stanfax 234) [Standard Adhesives Co., Dalton, Ga.]. The total solids of the composition was adjusted to 83 percent with water. The several tests employed in determining the properties of the coating system are described hereinbelow.

The copolymer solutions of this invention were used to increase the viscosity of the above-described coating formulation to an initial viscosity of 14000 cps ±400, as measured with RVT Brookfield viscometer at 20 rpm.

The coatings were left undisturbed for 24 hours before the static viscosity was measured. The coatings were then agitated for 5 minutes before the restir viscosity was measured. If there is a substantial increase in these viscosities, the coating will be difficult to transfer and penetration of the coating into a substrate will be adversely affected. A decrease in these viscosities does not interfere with transfer, but the penetration into the substrate may be excessive resulting in excessive usage of coating material and/or defective carpet.

The shear rate viscosities, also measured with a RVT Brookfield viscometer, give a good indication of the pseudoplastic properties of the novel copolymer solutions to the coating system. Viscosity readings are taken at 1, 20 and 50 rpm which give three shear rates. The greater the difference between the low and high shear viscosities, the more pseudoplastic the coating will be. A certain amount of this type of flow is necessary to achieve the proper flow on the substrate. The pseudoplastic flow of coating formulations containing the copolymer solutions of this invention is well within the operating range of coating equipment.

The yield testing as used in the carpet industry and discussed here is not really a measure of yield point in rheological terms. It is a stress relaxation determination which gives an indication of coating flow at very low shear rates. In the test a Brookfield viscometer is used (a model RVT with #3 spindle was used), and the spindle is turned by hand to its limit of a 100 dial reading while in the coating.

The spindle is held in this position for 10 seconds. This is important because of the visco-elasticity of many coatings. After the 10 second hold, the spindle is released and readings are taken at various time periods. A one minute reading has become somewhat standard in the carpet industry. This stress relaxation test gives a good indication of the coating's ability to penetrate into a substrate, and if the yield is high, the coating's high ride property. The copolymer solutions of this invention demonstrate a useful range of coating placement properties.

Since most coatings regardless of type are heated to speed the curing process, the coating viscosities at elevated temperatures are important to the quality of the final product. This type of testing is referred to as heat stability. The coating is heated under agitation in a bath to various temperatures which depend on the coating application equipment, and viscosities are recorded. The temperatures evaluated here are 100° F., 140° F., and 160° F. (37.8°, 60° and 71° C.) which are useful for carpet type coatings.

If the viscosities increase as the temperature increases, the coatings will ride high once the substrate is in the oven. If the viscosities decrease as the temperature increases, the coatings will penetrate into the substrate during initial cure. The tests show that the copolymer solutions of this invention maintain a useful range of heat stability.

Many coatings are aerated or frothed before application to a substrate. The frothed viscosity gives another important rheological property of a coating. The coatings are frothed in a Hobart to a density of 800 grams per liter. A Brookfield viscosity is recorded using the RVT with a #6 spindle. This viscosity controls the placement of the coating prior to curing. The copolymer solution of this invention demonstrates useful ranges of frothed viscosities as shown by the data in Table B.

Latex films were used for tensile testing. The films consisted of 100 dry parts of a styrene butadiene latex, and 0.5 parts of a thickener. This material was drawn down on teflon sheet using a bird bar (0.030″). The resulting film was air-dried at room temperature for 12 hours, removed from the teflon plate and oven-cured for 10 minutes at 140° C. The tensile pulls were made with a ½″ dumbbell.

TABLE B*

| CS No. | Parts Thickener per 100 parts Dry Wet | Parts Thickener per 100 parts Latex Dry | Viscosity CPS | 24 hr. Static CPS | Restir CPS | Shear Rate 1 rpm | Shear Rate 20 rpm | Shear Rate 50 rpm | Yield #3 RV 1 min | Heat Stability 100° F. | Heat Stability 140° F. | Heat Stability 160° F. | Frothed Viscosity CPS | Tensile PSI(a) |
|---|---|---|---|---|---|---|---|---|---|---|---|---|---|---|
| 8 | 4.00 | 0.55 | 14300 | 13000 | 11700 | 85000 | 13500 | 7800 | 35 | 18000 | 19000 | 18250 | 13000 | 2409 |
| 10 | 8.72 | 1.24 | 13800 | 15200 | 12100 | 138000 | 15200 | 8320 | 72 | 14000 | 13300 | 13600 | 21400 | 2158 |

*Latex consisted of 100 dry parts styrene/butadiene copolymer, 600 dry parts ground calcium carbonate, 1.2 dry parts forming agent. Total solids content of the latex 83%, adjusted with water.
(a) unloaded latex films using Dow RAP 200 latex.

Additional thickeners were developed with the copolymer solutions designated CS#248, 249 and 250 substantially as described above for CS#8 and 10.

The physical properties of the copolymer solutions alone, specifically total solid percentages, pH and viscosity were measured and shown in Table C.

TABLE C

|  | MCB 248 | MCB 249 | MCB 250 |
|---|---|---|---|
| Total Solids, % | 4.76 | 4.31 | 4.63 |
| pH | 10.1 | 11.8 | 12.5 |
| As-Is Viscosity, cps RVT, 20 rpm, sp 6 | 15600 | 21000 | 45000 |

The physical characteristics, tensile strength and percent elongation of these compositions as thickeners in one typical coating composition were measured at a cure time of 10 minutes at 130° C. and the results illustrated in Table D below. The cure time of 10 minutes is representative of actual coating operations. Additional cure times are simply not economic in the modern production plant. The compositions of the present invention provide enhanced tensile strength to coating compositions which are of significant economic value to coating and carpeting manufacturing processes.

TABLE D

| RIC 69727 Latex dry | 100 | 100 | 100 |
|---|---|---|---|
| Filler D-70 | 50 | 50 | 50 |
| Thickener Examples | MCB 248 | MCB 249 | MCB 250 |
| Thickener TSC | 4.760 | 4.310 | 4.630 |
| Thickener wet parts | 16.900 | 21.900 | 19.400 |
| Thickener dry parts | 0.804 | 0.944 | 0.898 |
| #5 @ 20 rpm Initial Viscosity | 9700 | 9000 | 9000 |
| 24 Hours Before Stir | 9850 | 9350 | 9100 |
| 24 Hours After Stir | 8400 | 7800 | 7450 |
| Tensile PSI   10 min | 501.2 | 580.1 | 641.9 |
| % Elongation cure at | 489.0 | 498.0 | 569.0 |

TABLE D-continued

130° C.

Additional characteristics of these compositions of the present invention in another coating composition are reported in Table E below. The results demonstrate that compositions of this invention are characterized by an appropriate viscosity and stability for coating use and are thus of value in meeting the practical needs of an adhesive system, particularly for carpet coatings. These products demonstrate great resistance to movement in frothed compound which relates in practical use to coat weight control. This feature benefits the manufacturer in instantly improved adhesive economics beyond the previous norm in the traditional industrially accepted manufacturing processes.

TABLE E

|  | dry | wet | dry | wet | dry | wet |
|---|---|---|---|---|---|---|
| RIC 69727 Latex | 100 | 177 | 100 | 177 | 100 | 177 |
| Filler D-70 | 600 | 600 | 600 | 600 | 600 | 600 |
| Water | — | 65 | — | 65 | — | 65 |
| Froth Aid SCT 756 | 1.5 | 5.0 | 1.5 | 5.0 | 1.5 | 5.0 |
| Thickener Examples | MCB 248 | | MCB 249 | | MCB 250 | |
| Thickener wet parts | 19.000 | | 27.300 | | 28.300 | |
| Thickener dry parts | 0.904 | | 1.180 | | 1.310 | |
| SP5 20 rpm Initial Viscosity | 14,200 | | 14,500 | | 14,000 | |
| 24 Hours Before Stir | 23400 | | 23200 | | 24700 | |
| 24 Hours After Stir | 15700 | | 13900 | | 16800 | |
| Froth Time | 1:36 | | 1:21 | | 1:30 | |
| Cup Weight g/3 oz | 70.8 | | 75.5 | | 69.3 | |
| Froth Viscosity | 24200 | | 21800 | | 19900 | |
| pH of Compounds | 8.88 | | 8.95 | | 9.06 | |

Numerous modifications and variations in practice of the present invention are expected to occur to those of skill in the art. For example, other nonionic primary amine surfactants falling within the described formulae are expected to function appropriately in the copolymer products, solutions and methods of this inventions. Additionally other components analogous to those described herein, e.g., other isocyanates, are also expected to be selected by one of skill in the art and function according to the invention. Such modifications and variations are believed to be encompassed by the scope of the appended claims.

What is claimed is:

1. An aqueous copolymer solution useful for thickening and improving the rheology and dry tensile strength of latex systems comprising a copolymer having as monomeric units:
   (A) about 79-99 percent of a (meth)acrylic acid salt of sodium, potassium or ammonium;
   (B) about 0-20 percent of (meth)acrylic acid;
   (C) about 0-20 percent of a lower alkyl ester of (meth)acrylic acid;
   (D) about 1-21 percent of surfactant monomer which is the urea reaction product of a monoethylenically unsaturated monoisocyanate with a nonionic surfactant having the formula

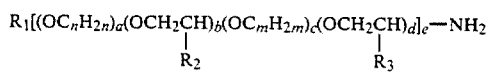

where $R_1$ is a $C_8$ to $C_{20}$ alkyl or a $C_8$ to $C_{20}$ alkylphenyl or a di($C_8$ to $C_{20}$ alkyl)phenyl, n and m are independently selected from 2 to 4, a and c are independently selected from the range of 0 to 100, provided that a+c is within the range of 2 to 100; $R_2$ and $R_3$ are independently selected from $CH_3$ or $CH_2CH_3$, b and d are independently selected from the range of 0 to 50, provided that b+d is within the range of 0 to 50; and e is from 1 to 50; wherein the sum of a+c is always greater than the sum of b+d;
   (E) about 0-1 percent of a copolymerizable polyethylenically unsaturated monomer, said percentages being by weight based on the total weight of monomeric units in said copolymer.

2. A copolymer solution according to claim 1 wherein the nonionic surfactant of (D) has the formula

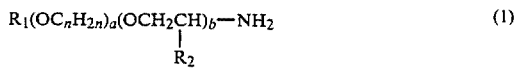  (1)

or

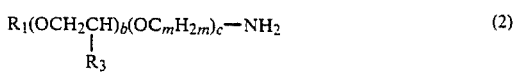  (2)

where $R_1$ is octylphenyl, di-octylphenyl, nonylphenyl or di-nonylphenyl, n or m is an integer from 2 to 4, a and c are from 3 to 30, $R_2$ and $R_3$ are $CH_3$ or $CH_2CH_3$, and b is from 0 to 10.

3. A copolymer solution according to claim 1 in which said copolymer is composed of (A) about 92-99 percent (meth)acrylate salt units, (B) about 0-8 percent (meth)acrylic acid units, (C) about 0-8 percent (meth)acrylic lower alkyl ester units, (D) about 1-8 percent surfactant monomer units, and (E) about 0.1-0.5 percent crosslinking monomer units.

4. A copolymer solution according to claim 1 in which said (meth)acrylic acid salt units (A) comprise sodium acrylate units.

5. A copolymer solution according to claim 1 in which said alkyl (meth)acrylate units (C) have the general formula $$CH_2=CYZ$$

where Y is hydrogen or $CH_3$ and Z is

where R is alkyl containing from 1 to 4 carbon atoms.

6. A copolymer solution according to claim 5 in which said alkyl (meth)acrylate units (C) are selected from the group consisting of methyl acrylate, ethyl acrylate, propyl acrylate, butyl acrylate, methyl methacrylate, ethyl methylacrylate, propyl methacrylate and butyl methacrylate.

7. A copolymer solution according to claim 1 wherein said surfactant monomer units are the urea reaction product of an isocyanate of the formula

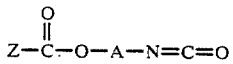

where A is an alkylene group of the formula $(CH_2)_n$ where n is an integer of from 1 to 20, Z is $CH_2=CH-$, $CH_2=C(CH_3)-$, $CH_2=CH-CH_2-$, with said surfactant.

8. A copolymer solution according to claim 1 wherein said surfactant monomer units are the urea reaction product of alpha-, alpha-, dimethyl-m-isopropenyl benzyl isocyanate with said nonionic surfactant.

9. A copolymer solution according to claim 1 wherein said nonionic surfactant is nonylphenoxy poly[(oxyethylene)$_{9.5}$(oxypropylene)$_2$] amine.

10. A copolymer solution according to claim 1 in which said polyethylenically unsaturated crosslinking monomer is selected from the group consisting of diallyl phthalate, vinyl crotonate, allyl methacrylate, and divinyl benzene.

11. A copolymer solution according to claim 1 in which the major portion of said (meth)acrylate salt monomeric units (A) are obtained by hydrolysis of lower alkyl (meth)acrylate monomeric units.

12. A copolymer solution according to claim 11 in which said solution has a pH greater than about 7.

13. A copolymer solution according to claim 1 in which the major portion of said (meth)acrylate salt units (A) are obtained by neutralization of the carboxyl groups of (meth)acrylic acid monomers.

14. A copolymer solution according to claim 13 in which said solution has a pH of at least about 6.

15. A copolymer solution according to claim 1 wherein said surfactant units comprise the urea reaction product of isocyantoethylmethacrylate and nonylphenoxy poly[oxyethylene)$_{9.5}$(oxypropylene$_2$] amine.

16. A copolymer solution according to claim 1 wherein said surfactant units comprise the urea reaction product of alpha-, alpha-, dimethyl-m-isopropenyl benzyl isocyanate and nonylphenoxy poly[(oxyethylene)$_{9.5}$(oxypropylene)$_2$] amine.

* * * * *